April 5, 1938.  A. H. J. DE L. SAINT GENIES  2,113,476
METHOD OF COPYING GOFFERED FILMS
Filed June 15, 1935   2 Sheets-Sheet 1
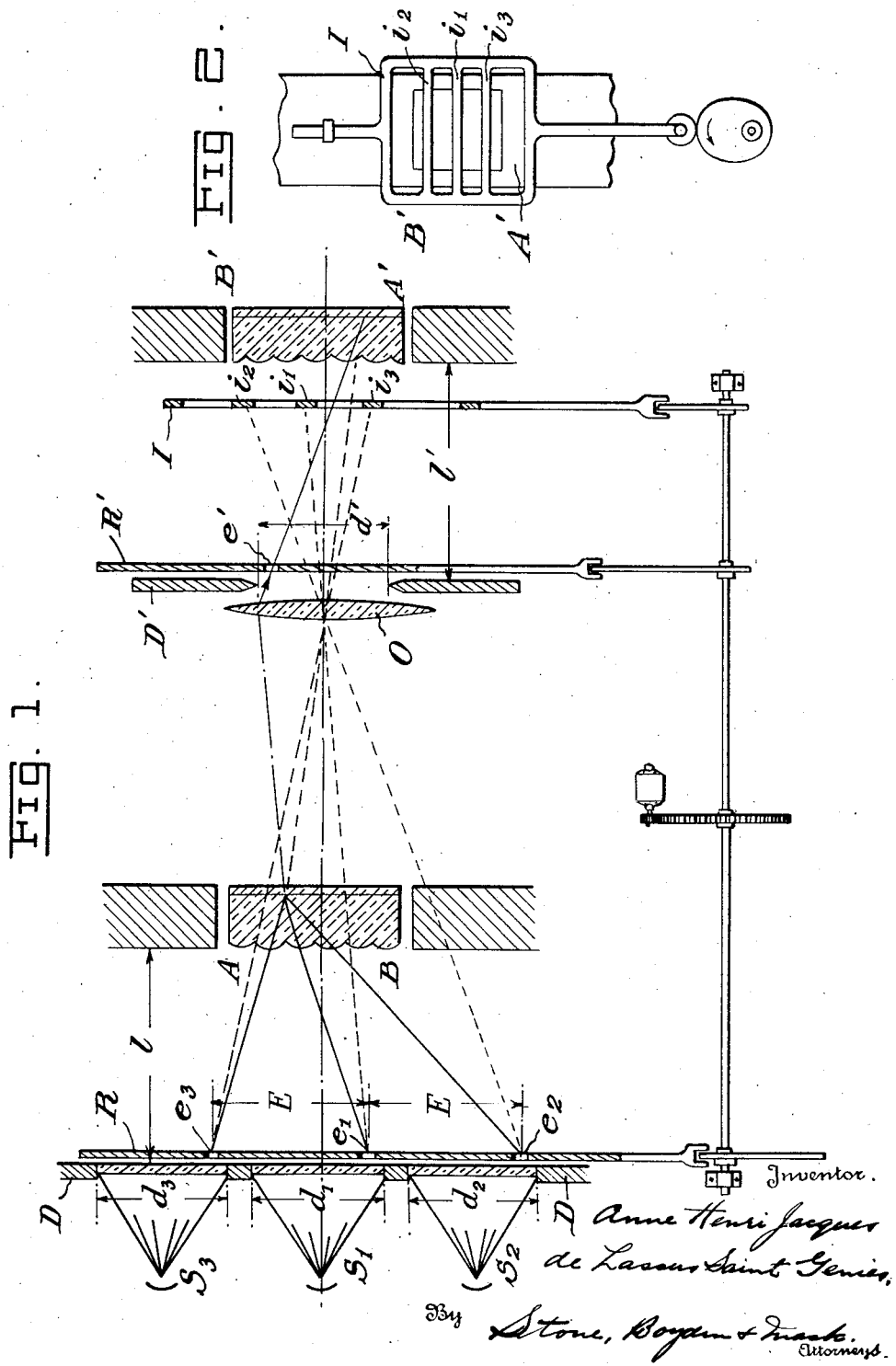

Patented Apr. 5, 1938

2,113,476

UNITED STATES PATENT OFFICE 2,113,476

METHOD OF COPYING GOFFERED FILMS

Anne Henri Jacques de Lassus Saint Genies, Versailles, France

Application June 15, 1935, Serial No. 26,863
In France June 19, 1934

4 Claims. (Cl. 88—24)

It has already been proposed to copy a goffered original film on a goffered copy film by arranging the two films with their gofferings directed towards a luminous source, a copying optical system being situated between them, and by successively unmasking corresponding parts of the pupil through which the original is illuminated as well as of the pupil of the copying optical system.

The application of this method presents certain difficulties, and the object of the present invention is to avoid such difficulties. It has more particularly for its object to reduce the time of exposure, to suppress the disturbances due to the introduction of parasitic luminous beams on the copy, to adapt the copy to the conditions of projection in the cinema, and to compensate the possible distortions of its macroscopic image.

When, during copying, the original film is illuminated by one or more luminous sources or with the aid of diaphragms, slots or movable screens, there is generally formed between the two films one or more, more or less blurred and diffracted, real images of the light source or sources. These images are due to the more or less pronounced transparency of the original and they may interfere with the correct recording of the images of the copy. It has already been proposed to reduce the transparency of the original by, for instance, covering its emulsion with a diffusing layer, but this measure introduces light losses.

According to the present invention, the harmful effect of the above mentioned real images of the light source or sources, formed by the copying optical system, is removed by intercepting all the luminous beams which would appear to have an origin other than the aperture or the movable slot associated with the copying optical system.

To this end, use may be made either of movable opaque screens which are always placed at the points in space where the said real images are formed, or of optical means which cause any image of the source to coincide at any moment with the movable aperture of the copying optical system. To increase the quantity of light acting on the copy, for the purpose of accelerating the reproduction, it is possible, according to the invention, to employ simultaneously several light sources by arranging them so that they always illuminate the same components of the original.

For compensating the possible distortions of the copy, due to the application of the optical means mentioned above, use may be made of additional correcting optical systems adapted to give to the films at the same time the desired values of the convergence of their elementary beams.

The invention also provides means which allow of more easily choosing the distance of convergence and the aperture of the elementary beams of the copy.

The invention is illustrated diagrammatically in the accompanying drawings, in which Fig. 1 illustrates the invention applied to copying by projection;

Fig. 2 shows the structure of the movable opaque screens mounted in front of the copy film;

Figure 3:
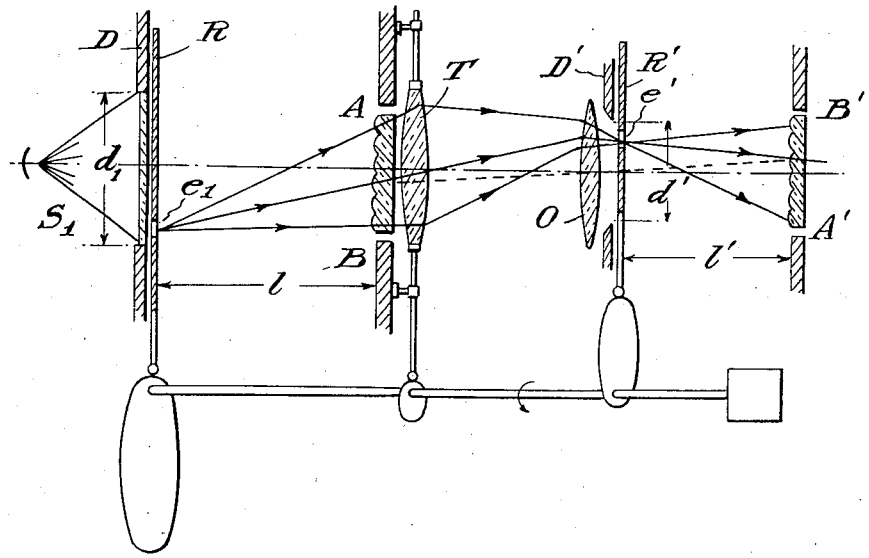
Fig. 3 illustrates a modification of Fig. 1.

Referring to Fig. 1, the lenticulated original film AB is copied by projection onto the copy film A'B' by means of the optical system O. $S_1$ is a light source arranged in front of an aperture $d_1$ in a fixed screen D which aperture acts as a pupil illuminating AB. This pupil is scanned by a slot $e_1$ in a movable opaque screen R. Another movable opaque screen R' having a slot $e'$ effects the scanning of a diaphragm D' having the opening $d'$. This opening acts as a pupil illuminating the copy film. The separation of the components of each image is effected by the homothetic displacements of the slots $e_1$ and $e'$; the distances $l$ and $l'$ as well as the distances through which the slots move (which distances equal $d_1$ and $d'$) correspond respectively to the convergences of the two films and to the angular apertures of their elementary diopters.

According to the present invention, instead of employing a single illuminating slot $e_1$, two or more additional slots $e_2$, $e_3$, etc., are employed, the spacings E being such that all the slots cooperate to produce the illumination of the same component image over the whole extent of the original film. For this purpose, there may be provided in the wall D a corresponding number of additional illuminating apertures $d_2$, $d_3$, having the same width. As many additional illuminating sources $S_2$, $S_3$ may equally be used. Both screens R and R' being moved homothetically, the components recorded on the original film by the lenticulations, in a manner known per se, are exposed, projected and copied onto the copy film successively.

As shown in Fig. 1, the same component image of the original film is simultaneously illuminated by all slots $e_1$, $e_2$, $e_3$ etc. It will be appreciated that the intensity of light falling on the original film is the greater the more there are light sources and/or apertures in the screen R. When the slots are in a certain position, the lenticulations of the original film cause only a certain part of the emulsion, which corresponds to a certain component image, to be illuminated. The light emitted by this component of the film AB passes through the optical system O and the slots $e'$ onto the copy film A'B' the lenticulations of which cause only the corresponding parts of its sensitive layer which correspond to the illuminated component of the original, to be exposed. When the slots of the screens R and R' are displaced homothetically, all the component images are successively projected onto the copy film. Alternatively, instead of using a movable screen R, the light sources, situated in $e_1$, $e_2$, $e_3$ etc. may be moved. Instead of three light sources, one common light source may be used. It is also possible to use any other number of apertures $d_1$, $d_2$, $d_3$; the component images are always successively exposed by shifting the screens R and R' homothetically.

Each of the apertures $e_1$, $e_2$, $e_3$, acting as corresponding movable sources, can produce in front of the goffering of the film A'B' more or less sharp real images $i_1$, $i_2$, $i_3$ formed by the objective O, and it is obvious that these images constitute sources of undesirable parasitic luminous beams which interfere with the useful beams emanating from the movable aperture $e'$. Their effects may be avoided by arranging at $i_1$, $i_2$, $i_3$ movable opaque screens, preferably of small dimensions, which are displaced together with the screens R and R' so that they occupy at any moment the positions of these images.

Fig. 2 represents an example of such movable screens. A metallic frame I is slidably mounted in front of the film gate of A'B'. It is moved so that its transverse bars $i_1$, $i_2$, $i_3$ always coincide with the above-mentioned real images of the slots $e_1$, $e_2$, $e_3$.

It has been proposed to design the optical system O combined with two collimating lenses in such a manner that the image $i_1$ of the light source or of the central aperture $e_1$ coincides at any moment with the aperture $e'$ of the screen R', whereby the image $i_1$ can no longer produce any parasitic effect.

If the optical system O does not allow of producing this coincidence of $i_1$ with $e'$, an arrangement as illustrated schematically in Fig. 3 may be employed wherein an additional optical system T, for instance, a simple non-collimating lens, is arranged in close proximity to the original film AB on the emulsion side. This optical system has for its object, by cooperating with the optical system O, to cause the image of $e_1$ to coincide with the aperture $e'$. The corresponding light beams are shown in this figure in which only one illuminating opening $d_1$ has been represented. The proper functioning of the optical system O is thereby practically unaffected.

However, the lens T may introduce a certain distortion of the macroscopic image of the film AB, seen from O, which distortion is reproduced on the film A'B'. To avoid this, there may be arranged in close proximity to the original film, in view-taking, a correcting lens which modifies the value of $d_1$ and of $l_1$ in a sense such that a lens T of greater focal length when copying may be satisfactory. It is even possible to arrange for the correcting lens employed in view-taking and the lens T to be such that the two respective distortions of the images compensate each other.

Figure 4:
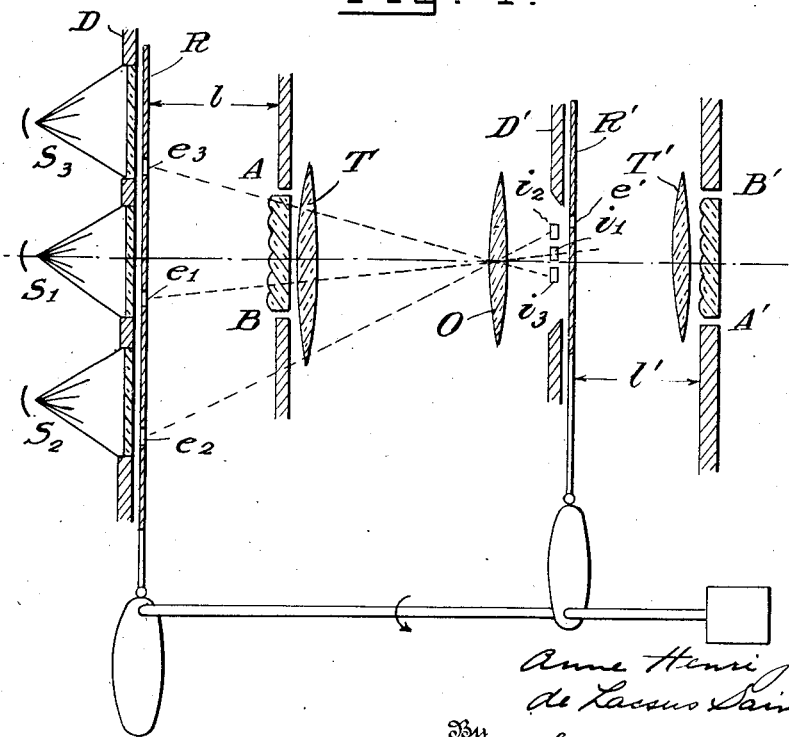
Fig. 4 illustrates a modification of Fig. 3.

Instead of employing a correcting lens in view-taking, a corrective lens may be arranged, as illustrated in Fig. 4, at T' near the copy film, in close proximity to its goffering. The possible distortion due to the lens T may then be compensated by T' which, at the same time, allows of giving to the magnitudes $d'$ and $l'$ of the copy film desired values which correctly conform to the conditions imposed by the subsequent projection.

For the same purpose, that is to say, for adapting the copy film to the projecting optical system by which it is subsequently projected in the cinema, an advantage may be gained from the fact that the images $i_1$, $i_2$, $i_3$ are blurred, confused and more or less interpenetrate, especially if the slots $e_1$, $e_2$, $e_3$ are sufficiently wide. A certain difference in all directions between the respective positions of the aperture $e'$ and of these images may then be allowed without disadvantage. Such a case of non-coincidence is shown in Fig. 4. Now, this difference permits greater latitude in the suitable choice of the values of $d'$ and of $l'$, that is to say, in the adaptation of the aperture and of the convergence of the elementary beams of the copy film to the projecting optical system of the cinema.

For promoting the spreading of the real images mentioned above, use may be made, in the case of an original having cylindrical lenticulations, of a cylindrical or cylindro-spherical lens T, the generatrices of which are orthogonal to the direction of the lenticulations of the original film. In all other cases of goffering, its generatrices must be substantially parallel to the direction of movement of the slot $e'$ on the copy side.

Another means which allows of increasing the latitude in the choice of the properties of the copy, without increasing the difference between the respective positions of $e'$ and $i_1$, consists in imparting to the optical system T, as shown in Fig. 3, slight lateral displacements associated with those of the slot of the screen R, the optical axis of this lens remaining parallel to the principal axis of the system.

Under these conditions, without introducing substantial disturbances in the reproduction of the macroscopic images, the position of the image of the source may be influenced so that it coincides to the desired extent with the desirable position of the movable slot on the copy side.

By the term "partial images" used in the appended claims is meant the complete monochrome components in the case of colour and the complete components corresponding to the different points of view in the case of relief.

I claim:

1. Means for copying a goffered original film onto a goffered copy film by projection, wherein the goffering of each film faces a source of light, said means comprising a support for said original film, a support for said copy film, a projecting objective between said supports, a plurality of movable narrow sources of light in front of said support for said original film, each of said sources of light being adapted to illuminate a single partial image on said original film, said sources of light being spaced so that the same illuminate the same partial image, a movable screen having a narrow window associated with the projecting objective, means for moving said movable screen homothetically with said sources of light, and means for intercepting and suppressing at least one of the images of said source of light formed by said objective in front of said copy film.

2. Means for copying a goffered original film onto a goffered copy film by projection, wherein the goffering of each film faces a source of light, said means comprising a support for said original film, a support for said copy film, a projecting objective between said supports, a plurality of movable narrow sources of light in front of said support for said original film, each of said sources of light being adapted to illuminate a single partial image on said original film, said sources of light being spaced so that the same illuminate the same partial image, a movable screen having a narrow window associated with the projecting objective, means for moving said movable screen homothetically with said sources of light, and an additional screen intercepting the rays which would form a real image of at least one of the light sources in front of the copy film.

3. Means for copying a goffered original film onto a goffered copy film by projection, wherein the goffering of each film faces a source of light, said means comprising a support for said original film, a support for said copy film, a projecting objective between said supports, a plurality of movable narrow sources of light in front of said support for said original film, each of said sources of light being adapted to illuminate a single partial image on said original film, said sources of light being spaced so that the same illuminate the same partial image, a movable screen having a narrow window associated with the projecting objective, means for moving said movable screen homothetically with said sources of light, and an additional optical system adjacent the non-lenticulated side of the original film adapted to form real images of the sources of light in the window of said screen.

4. Means for copying a goffered original film onto a goffered copy film by projection, wherein the goffering of each film faces a source of light, said means comprising a support for said original film, a support for said copy film, a projecting objective between said supports, a plurality of movable narrow sources of light in front of said support for said original film, each of said sources of light being adapted to illuminate a single partial image on said original film, said sources of light being spaced so that the same illuminate the same partial image, a movable screen having a narrow window associated with the projecting objective, means for moving said movable screen homothetically with said sources of light, an additional optical system adjacent the non-lenticulated side of the original film adapted to form real images of the sources of light in the window of said screen, and means for moving said additional optical system slightly synchronously with said movable screen.

ANNE HENRI JACQUES
DE LASSUS ST. GENIES.